United States Patent
Canning et al.

(10) Patent No.: US 10,221,614 B2
(45) Date of Patent: Mar. 5, 2019

(54) INSULATING GLASS UNIT COMPRESSION-INJECTION COATED PATCH AND METHOD

(71) Applicant: Quanex IG Systems, Inc., Cambridge, OH (US)

(72) Inventors: Leslie M. Canning, Cambridge, OH (US); Nathan T. Tuttle, New Concord, OH (US); Cody J. Walsh, Salmon, WA (US); Joseph D. Florio, Cambridge, OH (US); Kenneth F. Wayman, Port Washington, OH (US)

(73) Assignee: Quanex IG Systems, Inc., Cambridge, OH (US)

(*) Notice: Subject to any disclaimer, the term of this patent is extended or adjusted under 35 U.S.C. 154(b) by 41 days.

(21) Appl. No.: 15/256,122

(22) Filed: Sep. 2, 2016

(65) Prior Publication Data
US 2017/0089123 A1 Mar. 30, 2017

Related U.S. Application Data

(60) Provisional application No. 62/214,704, filed on Sep. 4, 2015.

(51) Int. Cl.
*E06B 3/673* (2006.01)
*E06B 3/663* (2006.01)
(Continued)

(52) U.S. Cl.
CPC ............ *E06B 3/67326* (2013.01); *B32B 7/12* (2013.01); *B32B 17/06* (2013.01); *E06B 3/667* (2013.01);
(Continued)

(58) Field of Classification Search
CPC .............. E06B 3/67326; E06B 3/6775; E06B 3/66342; B32B 7/12; B32B 37/04; B32B 37/06; B32B 37/10; B32B 37/12
See application file for complete search history.

(56) References Cited

U.S. PATENT DOCUMENTS

| | | |
|---|---|---|
| 3,921,359 A | 11/1975 | Brichard et al. |
| 4,057,945 A | 11/1977 | Kessler |

(Continued)

FOREIGN PATENT DOCUMENTS

| | | | | |
|---|---|---|---|---|
| CA | EP 0261923 A2 * | 3/1988 | ......... | E06B 3/66328 |
| CA | 1290624 | 10/1991 | | |

(Continued)

OTHER PUBLICATIONS

Mar. 1, 2017 European Search Report in related application 16187249.4-1601.

*Primary Examiner* — Donald J Loney
(74) *Attorney, Agent, or Firm* — Zollinger & Burleson Ltd.

(57) ABSTRACT

A method for applying a patch to a spacer discontinuity or other seal breach includes the step of applying pressure to the patch during the application of the patch to cause sealant carried by the patch to be injected into the spacer discontinuity. This step can be performed with or without the application of heat. Pressure is applied to the patch long enough to position the sealant entirely across the gap between the lights such that the sealant wets out against both interior glass surfaces. Pressure is also applied to the patch long enough to inject sealant into openings defining the discontinuity. A sealant is then applied over the entire patch. The structure of the patch and the patched IG unit are provided.

28 Claims, 3 Drawing Sheets

(51) Int. Cl.
*E06B 3/667* (2006.01)
*B32B 7/12* (2006.01)
*B32B 17/06* (2006.01)
*E06B 3/677* (2006.01)
*B32B 37/06* (2006.01)
*B32B 37/10* (2006.01)
*B32B 37/12* (2006.01)

(52) U.S. Cl.
CPC ...... *E06B 3/66328* (2013.01); *E06B 3/66342* (2013.01); *E06B 3/6775* (2013.01); *E06B 3/67339* (2013.01); *B32B 37/06* (2013.01); *B32B 37/10* (2013.01); *B32B 37/12* (2013.01); *E06B 3/66323* (2013.01); *E06B 3/67356* (2013.01); *E06B 2003/6638* (2013.01)

(56) References Cited

U.S. PATENT DOCUMENTS

| | | | |
|---|---|---|---|
| 4,453,855 A * | 6/1984 | Richter | E06B 3/667 403/295 |
| 4,551,364 A | 11/1985 | Davies | |
| 4,651,482 A * | 3/1987 | Borys | E06B 3/667 403/295 |
| 4,831,799 A | 5/1989 | Glover | |
| 5,270,084 A | 12/1993 | Parker | |
| 5,270,091 A | 12/1993 | Krysiak et al. | |
| 5,377,473 A | 1/1995 | Narayan et al. | |
| 5,439,716 A | 8/1995 | Larsen | |
| 6,329,030 B1 | 11/2001 | LaFond | |
| 6,793,971 B2 | 9/2004 | Trpkovski | |
| 6,804,924 B2 | 10/2004 | Zurn et al. | |
| 8,595,994 B1 | 12/2013 | Grommesh et al. | |
| 2001/0027600 A1 | 10/2001 | Hodek et al. | |
| 2006/0104710 A1 | 5/2006 | Lafond | |
| 2008/0152849 A1 | 6/2008 | Lenhardt | |
| 2010/0011703 A1 | 1/2010 | Seele et al. | |

FOREIGN PATENT DOCUMENTS

| | | |
|---|---|---|
| DE | 102005044860 A1 | 3/2007 |
| WO | 9505349 A1 | 2/1995 |
| WO | 0127429 A1 | 4/2001 |

* cited by examiner

INSULATING GLASS UNIT COMPRESSION-INJECTION COATED PATCH AND METHOD

CROSS REFERENCE TO RELATED APPLICATIONS

This application claims the benefit of U.S. Provisional Patent Application Ser. No. 62/214,704 filed Sep. 4, 2015; the disclosures of which are incorporated herein by reference.

BACKGROUND OF THE DISCLOSURE

1. Technical Field

The disclosure generally relates to insulating glass units and, more particularly, to devices and methods for sealing insulating glass units. Specifically, the disclosure relates to a patch and method of installing a patch at the joint of a spacer or other breaches in the seal in an insulating glass unit.

2. Background Information

The fenestration industry recognizes the importance of achieving an effective and enduring hermetic seal when manufacturing sealed insulating glass (IG) units. The seal is needed to minimize air intrusion and/or gas fill loss over the service life of the IG unit in order to optimize thermal insulation performance and durability.

The industry also recognizes the fact that any joint or discontinuity in an IG unit spacer is a break in the spacer's continuous seal which needs to be closed during production in order to provide the overall seal for the unit. The most common discontinuity is the start/stop location of the spacer where the first end of the perimeter spacer starts and second end of the perimeter spacer stops. These ends can touch each other or be closely spaced. Examples of IG unit spacer joints or discontinuities include 1) an angled joint when the start/stop joint is in a corner, 2) a straight joint when the start/stop joint is in a straight side, and 3) a splice in the spacer itself at a location other than the spacer start/stop application point. Examples of other seal breaches which need to be patched include capillary breather tube and wire insertion points, gas-fill holes and fasteners for internal IG components and the like.

The industry has published no general guidelines for closing discontinuities and other seal breaches. IG unit spacer discontinuity sealing has been customized depending on the specific spacer/sealant combination. The common practice has simply been to wrap a cover over the area to be patched. The typical cover has been either an adhesive-coated vapor barrier film or aluminum foil coated with PIB. It will be applied after one light has been installed, then either before or after the second light has been installed. In some applications, the wrapped cover application alone has been found to be an unreliable and ineffective seal. This cover helps to maintain the position of the spacer ends until the sealant is added to the outer channel.

BRIEF SUMMARY OF THE DISCLOSURE

The disclosure provides a method of sealing a spacer discontinuity in an insulating glazing unit, a method of forming an insulating glazing unit with a sealed spacer discontinuity, and an insulating glazing unit having a sealed spacer discontinuity. These methods and the unit includes a compression-injection patch that carries sealant and is applied over the spacer discontinuity with pressure to inject the sealant of the patch into the discontinuity. The patch is completely covered with sealant after installed. The methods can be performed manually or as part of an automated system.

The objective of the compression-injection patch application invention is to reliably, rapidly and cost effectively achieve an effective and enduring hermetic seal at each potential breach of the spacer seal of an insulating glazing unit including spacer joints, spacer splices, capillary tube and wire insertion points, gas-fill holes and fastener locations (all referred to herein as spacer discontinuities) when manufacturing sealed insulating glass (IG) units. The seal is needed to minimize exterior air intrusion into the insulating chamber of the unit and gas fill loss from the insulating chamber of the unit over the service life of the IG unit in order to optimize thermal insulation performance and durability of the unit.

The disclosure also provides a tool that is used to apply the patch.

With respect to the loss of gas from an IG unit such as argon, the British and European Standards (BS EN) EN1279 Part 3 requirement is the most stringent. This standard is incorporated herein by reference. To pass, EN1279-3 requires less than 1% argon loss per year following unit weathering. The disclosure provides a patch and method for installing a patch that allows the IG unit to meet this requirement.

The disclosure provides a patch having a backing layer carrying a sealant. The backing layer is engaged by the tool that applies pressure to the patch during the application process. The backing layer is a flexible material suitable for carrying sealant. A solid flexible film can be used for the backing layer. The film can be a polymer. The sealant can be a polyisobutylene (PIB) in one configuration of the patch. The exemplary configuration of the patch has a thickness of the PIB layer that provide enough sealant volume to be injected into the discontinuity and to wet out to both glass lights across the spacer width.

The disclosure provides a method for applying a patch to a spacer joint or discontinuity or other seal breach wherein the method includes the step of applying pressure during the application process to cause the sealant of the patch to be injected into the joint or breach. This step can be performed with or without the application of heat. With a manual hand tool, the typical time at room temperature is about five seconds. The pressure can be held for about twenty seconds. Pressure is applied until the desired result is achieved. Pressure is applied to the patch long enough to position the sealant entirely across the gap between the lights such that the sealant wets out against both interior glass surfaces. Pressure is also applied to the patch long enough to inject sealant into openings between the ends of the spacer that define the joint or breach being patched.

The disclosure provides a method wherein the patch can be connected to the spacer either before, during, or after the glass lights are attached to the spacer. Regardless of when the patch is positioned, the pressure is applied after the glass lights are secured to the spacer.

The pressure can be applied with a tool that has a width that is slightly less wide than the space between the interior surfaces of the glass lights such that even pressure is applied across the patch and the space for flow of sealant out around the tool is minimized. A tool with a notch that matches the corner (such as 90 degrees) is used for corners and a straight tool or other custom shape is used for joints and breaches located along a straight section of spacer. The tool heads themselves may be heated or heat may be applied with a heat gun before or at the same time the pressure is applied.

The preceding non-limiting aspects, as well as others, are more particularly described below. A more complete understanding of the processes and equipment can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

Similar numbers refer to similar parts throughout the specification.

DETAILED DESCRIPTION OF THE DISCLOSURE

Figure 1:
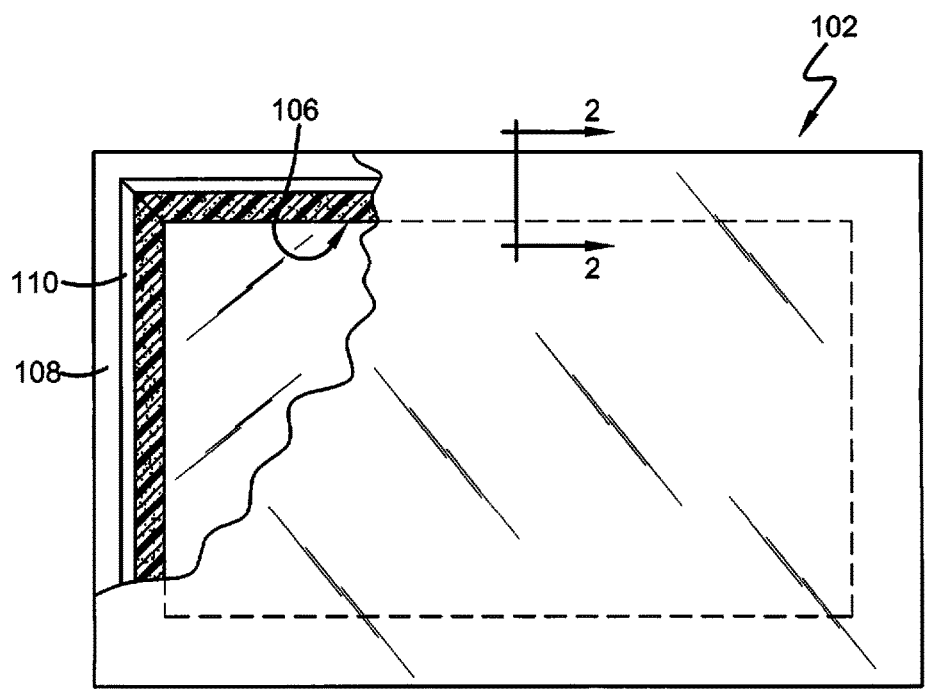
FIG. 1 is a front elevation view of an insulating glass unit with the spacer defining a corner discontinuity at the upper left hand corner.
Figure 2:
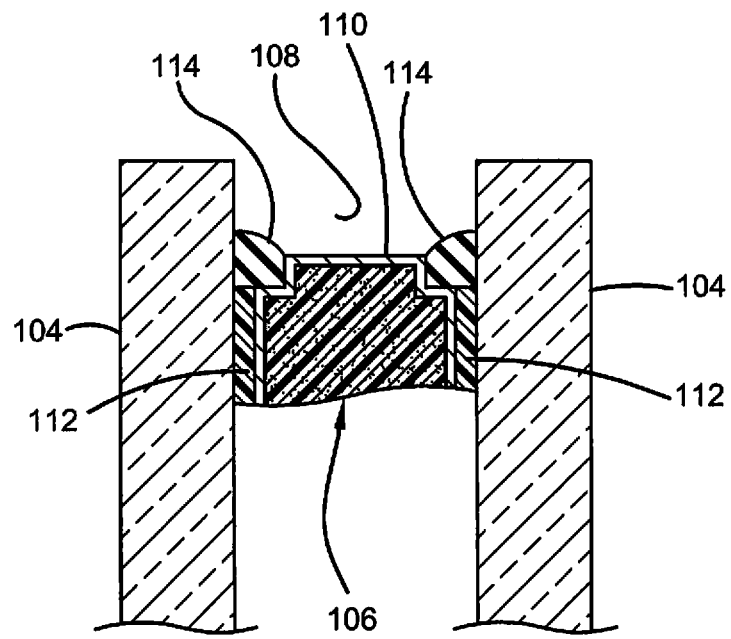
FIG. 2 is a section view taken along line 2-2 of FIG. 1.

FIG. 1 depicts a front elevation view of an insulating glass unit 102 that generally includes first and second glass lights 104 held apart by a spacer 106 disposed inwardly of the outer perimeter of glass lights 104 to define an outer channel 108. Example configurations of spacer 106 can be any of the configurations disclosed in U.S. Pat. No. 4,831,799 or U.S. Pat. No. 6,581,341, both of which are incorporated herein by reference to disclose spacer structures, sealants, and adhesives. Other spacer 106 configurations can be used such as the spacer configuration sold under the TruPlas trademark (OHIM Registered Trademark 11,774,908) (http://www.edgetechig.co.uk/truplas.asp). The TruPlas® spacer is a rigid, glass reinforced thermoplastic spacer. In the example depicted in the drawings, spacer 106 has a flexible body that may be foam and may be desiccated. A vapor barrier 110 can be fully or partially wrapped about the sides of the spacer body. An adhesive 112 secures spacer 106 to the inwardly-facing surfaces of glass lights 104. Adhesive 112 can be an acrylic adhesive. Sealant 114 forms a primary seal between the interior surfaces of the glass lights 104 and spacer 106. As shown in FIG. 2, sealant 114 is disposed in at least the corners between the spacer body and the glass lights. Sealant 114 can also extend entirely across the spacer between lights 104. Sealant 114 can be a made from any self adhering material that has low gas and moisture permeability including polyisobutylene, saran, and epoxy adhesives. The sealants can provide improved MVT characteristics, e.g., less than 10 g/m2/day, and improved gas barrier capabilities. Examples of low MVT sealants include thermoplastic materials, such as hot-melt materials, e.g., polyisobutylene (PIB). PIB materials typically have a low MVT value of about 1.0 g/m2/day or less. A majority of the volume of the sealant can be made up of PIB.

Figure 3:
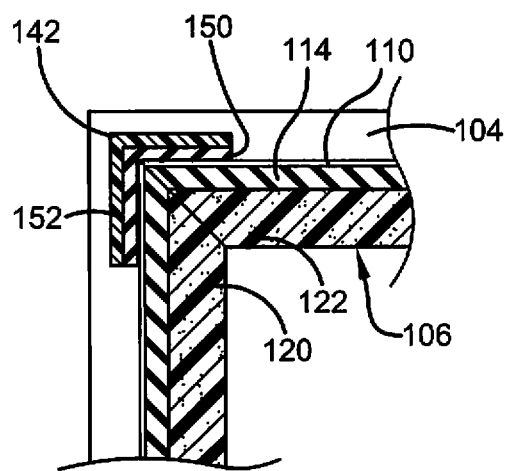
FIG. 3 is an enlarged elevation view of the corner of FIG. 1 with a patch initially placed over the corner discontinuity.

FIG. 3 depicts a spacer discontinuity located at a corner of the unit wherein the ends 120 and 122 of spacer 106 abut or are closely spaced. This corner is ninety degrees. Patch 142 can be bent around the corner as it is applied, bent into a shape that matches the corner before the patch is applied, or provided in a shape that matches the corner. Regardless of how tightly ends 120 and 122 are pressed together, this discontinuity location creates a large risk for vapor intrusion into unit 102 and/or for gas loss from unit 102. For example, when argon is added to unit 102 to increase its R value, the manufacturer needs to guard against the argon leaking out.

Before sealant 140 is added to channel 108, a patch 142 is applied over the joint and pressed into place with pressure. Optionally, heat can be applied either by preheating patch 142, by a heat gun that directs hot air to patch 142 and the spacer, by heating the glass lights 104 at the location of the discontinuity, or by a heated tool head 144 that applies the pressure to patch 142. Patch 142 can be applied over the discontinuity of spacer 106 after spacer 106 is applied to one light 104 or after both lights 104 are secured to spacer 106. Heat is applied in an amount sufficient to raise that heated portion to a temperature above ambient in the location where the patch is being applied. After patch 142 is applied, sealant 140 is added to channel 108 to completely cover patch 142.

Figure 4:
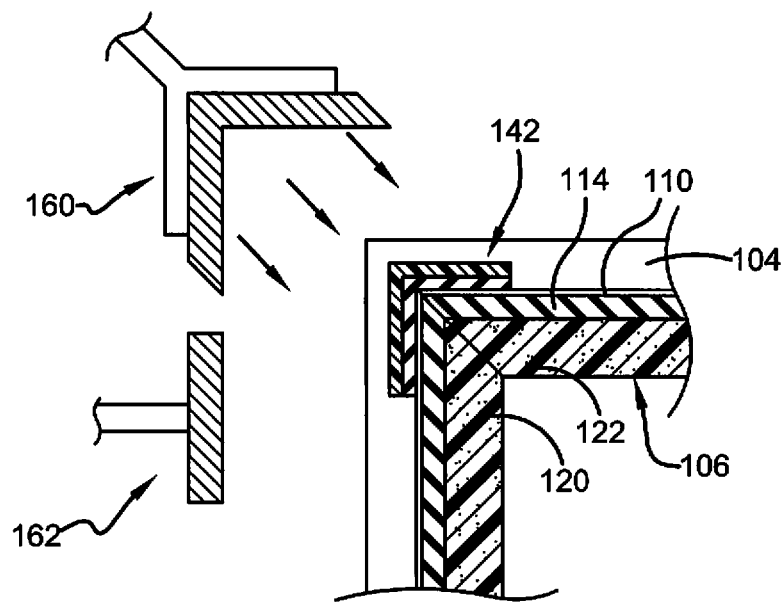
FIG. 4 is an enlarged elevation view of the corner of FIG. 1 with exemplary tools that applied pressure to the patch to inject sealant into the discontinuity of the spacer.
Figure 5:
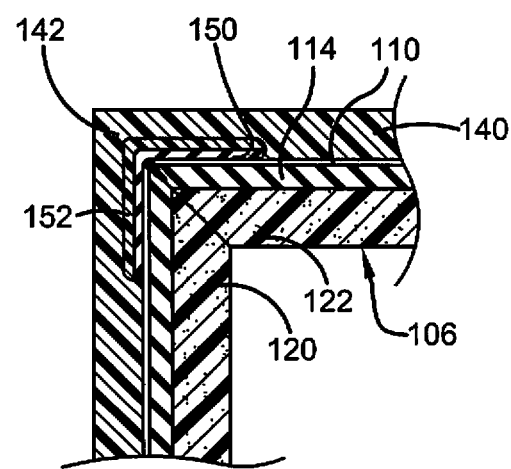
FIG. 5 is an enlarged elevation view of the corner of FIG. 1 with the sealant positioned over the applied patch.

Patch 142 includes a sealant layer 150 carried by a substrate 152. The sealant is polyisobutylene-based (PIB-based) or an equivalent. Substrate 152 is a solid flexible durable film with suitable barrier properties. Sealant layer 150 has a thickness of 2.54 mm (0.10 inch) and can be 2 mm (0.08 inch) or as thin as about 1 mm (0.04 inch). These thicknesses provide enough sealant volume to be injected into the discontinuity and to wet out to both glass lights across the spacer width. When the pressure is applied to patch 142 when it is trapped between lights 104—regardless of the application of heat—sealant 150 is injected into the joint defined between ends 120 and 122 and forces sealant 150 to flow from glass edge to glass edge and into open spaces (voids) below and adjacent to patch 142 thereby blocking pathways for gas diffusion in either direction (inside-to-outside or outside-to-inside). The time duration of the pressure applied to patch 142, with or without additional heat, may be either brief or sustained as needed to achieve the injection of sealant 150 into the joint and the flow of the sealant from glass-to-glass and into all the open spaces (voids) below and adjacent to patch 142. Joint patch 142 itself carries enough polyisobutylene (PIB), or equivalent, sealant so that when pressure is applied to patch 142 and sustained as needed, either with or without additional heat, there is sufficient sealant to flow into the joint and essentially all of the spaces (voids) below and adjacent to patch 142 and create a durable hermetic seal. FIG. 4 depicts first 160 and second 162 tools that are used to apply pressure and the optional heat to patch 142. Tool 160 is used for corner patches 142 while tool 162 is used for flat patches 142 that can be used over splices or other seal breaches such as wires, capillary tubes, gas-fill holes, support fasteners. Each tool 160 and 162 has a head that engages patch 142. The heads have widths that are slightly narrower than the spacer between lights 104 so that they may be used to apply a uniform controlled pressure and/or heat to the coated patch 142. The width of the tool head is about 2 mm less than the spacer width or gap between the two lights of glass. The spacer can have a width of 4.50 mm to 25.00 mm. If the patch is being applied around a corner, a tool 160 with a notch of about the same angle as the corner can be used. If the joint is on a straight side, a straight tool 162 can be used.

If the breach is due to capillary tube or wire insertion points, gas-fill holes or IG component fasteners, a custom designed tool can be used.

The application of a suitable sealant-coated patch 142 using the novel compression-injection method, with or without additional heat, has been found to be more likely than the known prior art method described above to produce a hermetic seal from glass-to-glass in an IG unit spacer joint. The advantage of creating an effective joint seal is improved IG unit durability and thermal performance over the service life of the IG unit as well as a greater probability that test units will pass certified laboratory testing to industry standards such as EN1279 and ASTM E2190. Test results from Argon permeation studies indicate that on unit builds where the only change was injection corner patch that precision was increased by a factor of 10 and level of argon permeation was decreased by a factor five.

Patch 142 can be formed and applied manually or as part of an automated IG assembly method. Exemplary description of method steps follow.

Joint Patch Application Sequence (largely independent of IGU construction sequence and gas fill method)

1. Cut the PIB, or equivalent, sealant-coated joint patch to the proper width and length. The width of the patch should be slightly less than the width of the spacer itself. A typical patch length will be about 38.10 mm (1.5 inches) to 50.80 mm (2.0 inches). If the IG unit is triple-glazed or quadruple-glazed, the patch for each spacer joint should be cut to size based on the width of the spacer in each airspace.
2. Protect the patch so both sides remain clean, undamaged and free to adhere.
3. Position the properly sized coated joint patch over the joint such that it is centered over the joint in both directions (width and length).
4. With both lights of glass enclosing the airspace matched to the spacer, apply pressure, with or without additional heat, to the joint patch until the PIB or equivalent sealant has been injected into the joint and has flowed into the voids below and around the patch forming a continuous hermetic seal from glass light to glass light. The use of a tool to assist with the application of pressure and/or additional heat is recommended but not required.

In an automated IG assembly method, patches 142 can be supplied in a continuous strip of patch material which can be stored on a reel. Another semi-automated or manual option is "pick-and-place" where the patch is precut to the desired width and length and spooled up on a release liner. This varies by equipment manufacturer and can be semi-automated. Patches 142 can be formed by cutting the continuous strip to the desired length as the patch is needed. One or both sides of the patch material can be protected with a release liner to limit contamination of the sealant of the patch. In another configuration, patches 142 are carried by a reel on one release liner or between two release liners but each patch 142 is already cut to length and/or width. In both configurations, patches 142 can be positioned over the spacer joint after the lights 104 are positioned on the spacer and a tool 160 or 162 can be brought into contact with the patch to apply the pressure needed to inject the sealant into the joint. In another configuration, a roller can be applied from one end of the patch to another to apply the pressure. As described above, the application of additional heat either to the joint, the patch and the joint, or just to the patch is an options. A heat gun may be used to apply the heat. The patch 142 is applied and pressurized prior to the addition of the sealant 140 into the sealant channel 108.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A method of assembling and sealing an insulating glazing unit having a spacer discontinuity; the method comprising the steps of:
   (A) connecting a spacer to first and second glass lights wherein the spacer has at least one spacer discontinuity; the spacer having an inwardly facing surface and an outwardly facing surface;
   (B) connecting a sealant layer of a patch to the outwardly facing surface of the spacer over the spacer discontinuity; the sealant layer being carried by a patch substrate;
   (C) applying pressure to the patch to force a portion of the sealant of the sealant layer into the discontinuity; and
   (D) covering the patch with a sealant after step (C).

2. The method of claim 1, wherein step (B) occurs before both glass lights are connected to the spacer.

3. The method of claim 1, wherein step (A) includes the step of locating the spacer inwardly of outer perimeter edges of the first and second glass lights to form a channel and step (D) includes the step of adding the sealant to the channel.

4. The method of claim 1, further comprising the step of adding argon to an insulating chamber defined by the first and second glass lights and the spacer.

5. The method of claim 4, further comprising the step of applying pressure to the patch with a tool having a shape that matches the shape of the spacer at the spacer discontinuity.

6. The method of claim 5, further comprising the step of heating a portion of the patch prior to step (B).

7. The method of claim 5, further comprising the step of heating a portion of the spacer prior to step (B).

8. The method of claim 5, further comprising the step of heating a portion of the patch during step (C).

9. The method of claim 1, wherein the step of connecting a sealant layer of a patch over the spacer discontinuity includes the step of centering the patch over the spacer discontinuity.

10. The method of claim 1, wherein step (A) includes the step of adhesively connecting the spacer to the glass light.

11. The method of claim 10, wherein step (A) includes the step of adhesively connecting the spacer to the glass light with an acrylic adhesive.

12. The method of claim 1, wherein the spacer discontinuity is located at a spacer corner and the method further including the step of bending the patch around the corner.

13. The method of claim 1, wherein the spacer discontinuity is located at a spacer corner and the method further including the step of providing the patch with an orientation that matches the corner.

14. The method of claim 1, further comprising the step of providing the sealant layer with a thickness of at least 1 mm.

15. A method of sealing a spacer discontinuity in an insulating glazing unit wherein a spacer is positioned between first and second glass lights; the spacer having an inwardly facing surface and an outwardly facing surface; the method comprising the steps of:
  (A) connecting a patch sealant layer of a patch to the outwardly facing surface of the spacer over the spacer discontinuity; the patch sealant layer being carried by a patch substrate;
  (B) applying pressure to the patch substrate to force a portion of the patch sealant of the patch sealant layer into the discontinuity; and
  (C) covering the patch with a sealant after step (B).

16. The method of claim 15, wherein the patch includes a solid flexible film substrate.

17. The method of claim 15, wherein the spacer is located inwardly of outer perimeter edges of the first and second glass lights to form a channel and step (C) includes the step of adding the sealant to the channel.

18. The method of claim 15, further comprising the step of applying pressure to the patch with a tool having a shape that matches the shape of the spacer at the spacer discontinuity.

19. The method of claim 18, further comprising the step of heating a portion of the patch prior to step (A).

20. The method of claim 18, further comprising the step of heating a portion of the spacer prior to step (A).

21. The method of claim 18, further comprising the step of heating a portion of the patch during step (B).

22. The method of claim 15, wherein step (A) includes the step of centering the patch over the spacer discontinuity.

23. The method of claim 15, wherein the spacer discontinuity is located at a spacer corner and the method further including the step of bending the patch around the corner.

24. The method of claim 15, further comprising the step of providing the sealant layer with a thickness of at least 1 mm.

25. The method of claim 15, wherein the pressure is applied for five to twenty seconds in step (B).

26. The method of claim 15, wherein the pressure is applied until the patch sealant wets out against the first and second glass lights.

27. The method of claim 15, further comprising the step of providing the sealant layer with a thickness of at least 1 mm and no greater than 2.54 mm.

28. The method of claim 1, further comprising the step of providing the sealant layer with a thickness of at least 1 mm and no greater than 2.54 mm.

* * * * *

UNITED STATES PATENT AND TRADEMARK OFFICE
CERTIFICATE OF CORRECTION

Page 1 of 1

PATENT NO. : 10,221,614 B2
APPLICATION NO. : 15/256122
DATED : March 5, 2019
INVENTOR(S) : Canning et al.

It is certified that error appears in the above-identified patent and that said Letters Patent is hereby corrected as shown below:

On the Title Page

Through the Claims, change the spelling of the word "light" to -- lite --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*